Feb. 27, 1962 S. DUINKER ETAL 3,023,166

MAGNETIC RECORD CARRIER

Filed Aug. 5, 1957 2 Sheets-Sheet 1

INVENTORS
S. DUINKER
A. L. STUIJTS
H. P. J. WIJN
W. K. WESTMIJZE
BY Frank R. Jifoni
AGENT INVENTORS
S. DUINKER
A. L. STUIJTS
H. P. J. WIJN
W. K. WESTMIJZE
BY Frank R. Jufan
AGENT 3,023,166

MAGNETIC RECORD CARRIER

Simon Duinker, Andreas Leopoldus Stuijts, Henricus Petrus Johannes Wijn, and Willem Klaas Westmijze, all of Eindhoven, Netherlands, assignors to North American Philips Company, Inc., New York, N.Y., a corporation of Delaware Filed Aug. 5, 1957, Ser. No. 676,221
Claims priority, application Belgium Aug. 18, 1956
4 Claims. (Cl. 252—62.5)

The invention relates to magnetic record carriers constituted by tapes of carrier material in which fine granular, magnetically anisotropic material is distributed. It is common practice to use to this end for example $Fe_2O_3$; it has furthermore been suggested to employ ferroxdure (for example $BaFe_{12}O_{19}$). However, these materials are capable of yielding satisfying results only to a certain extent.

The invention has for its object to provide a magnetic record carrier, the resolving power of which is higher and/or of which the reproduced signal is stronger than the known materials are capable of producing. It is characterized in that the magnetic material, by the choice of its chemical composition, has a direction-dependent permeability and is pre-oriented by means of an orienting process, so that the permeability of the tape, measured in the direction of thickness, is appreciably different from that measured in one of the directions at right angles to the direction of thickness.

The invention will be described more fully with reference to the drawing, in which.

Figure 1:
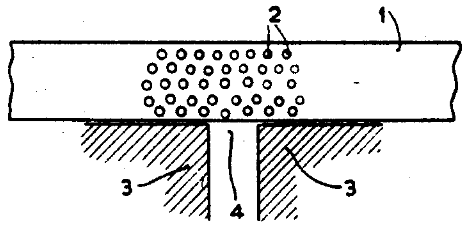
FIG. 1 shows one embodiment, in which the magnetic material is arranged in a manner such that the magnetic preferred plane coincides with the plane of the drawing.

FIG. 1 shows diagrammatically, on a greatly enlarged scale, a magnetic record carrier 1 constituted by a tape of carrier material, in which fine granular magnetic material 2 with a direction-dependent permeability is distributed, this tape being guided over the pole shoes of a magnetic recording and reproducing head 3 with an air gap 4. The magnetic material 2, in the form of discs, lies at right angles to the direction of width of the tape, which may be obtained by exposing the magnetic material to a pre-orienting, for example a rotating magnetic field, the rotary axis of which lies in the direction of the tape (i.e. at right angles to the plane of the drawing), during a phase of the manufacture in which the carrier material of the tape hardens. Such orienting processes are disclosed in copending U.S. application Ser. No. 662,386, filed May 29, 1957. This application discloses and claims a method of orienting a ferromagnetic material to make it anisotropic which is composed of particles each of which has a preferred plane of magnetization, i.e. the preferred directions of magnetization lie in a plane. In that method, the material while the particles are free to move, i.e. are in a mobile state, is subjected to either a stationary or a rotating magnetic field. If a stationary field is employed, the particles are oriented with the preferred planes of magnetization parallel to a line and if a rotating field is employed, the planes will be mutually parallel. The rotating field may be produced by rotating magnetic field producing means mechanically or by employing a plurality of electrically produced magnetic poles which are connected to a polyphase current source.

The magnetic material may for example be a ferroxplana and may have a composition: $Ba_2Me_2Fe_{12}O_{22}$ or $Ba_3Me_2Fe_{24}O_{41}$, wherein Me designates a bivalent metal ion or a metal group respectively which may contain for example Co, Ni, Mn, Fe, Mg, Zn. These materials are more fully described in an article by G. H. Jonker, H. P. J. Wijn and P. B. Braun, Philips Technical Review, vol. 18, No. 6, pp. 145–154 (November 1956). These materials are, briefly, compounds of BaO, $Fe_2O_3$ and MeO and have a hexagonal crystal structure similar to that of magnetoplumbite. These materials exhibit a preferred plane of magnetization, that is, within the plane, the magnetization direction is relatively arbitrary whereas in directions outside the plane, the material is difficult to magnetize. It is found that the materials then obtained have a comparatively high permeability, for example 15 to 40, in the plane of the discs (preferred plane of magnetization), but a very low permeability at right angles thereto, so that the discs can be readily pre-oriented in a desired position. Moreover, a number of these materials, especially if the metal group of Me contains cobalt, have a strong preferred direction also in the plane of the discs for the magnetization.

Figure 2:
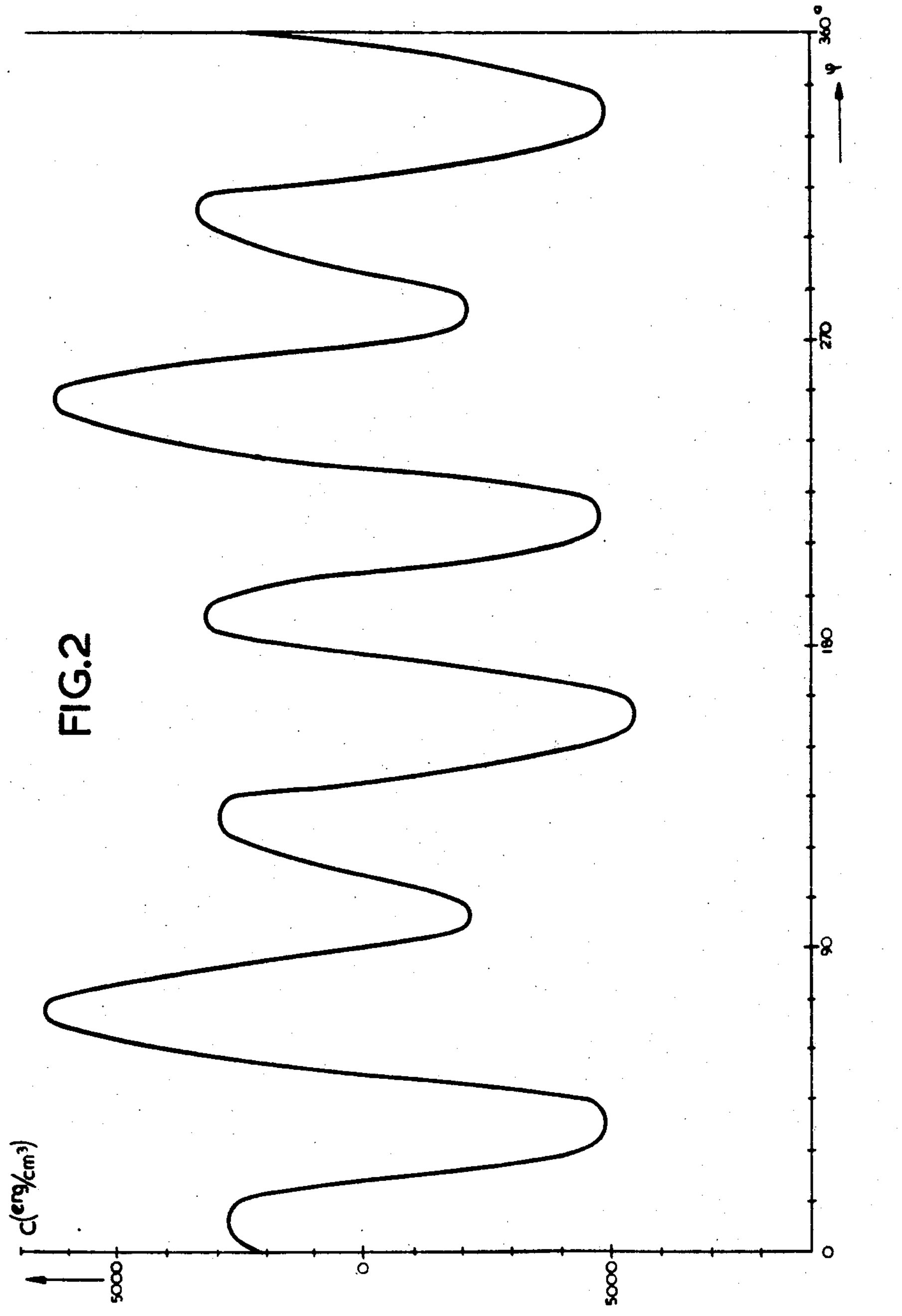
FIG. 2 shows characteristic curves to explain the embodiment shown in FIG. 1.

In FIG. 2 the crystal energy $c$ of such a material (chemical composition $Co_{1.92}Fe_{0.08}Ba_3Fe_{24}O_{41}$) as a function of the direction angle $\phi$ in the plane of the discs is plotted. The magnetization vector will adjust itself preferably in the direction of the minima of this crystal energy $c$. It is evident therefrom that where there are six preferred directions with a relative difference of 60° for the magnetization vector, the transitions from one preferred direction to the other requires the application of a certain minimum external magnetic field.

When moving such a magnetic record carrier over the pole shoes 3, a signal can be recorded, while the magnetization directions in the discs 2 is fixed in positions deviating not more than 30° from the field direction of the recording magnetic field, since with an arbitrary orientation of the preferred directions in the disc there is always one preferred direction which deviates less than 30° from the direction of the applied magnetic field. Thus a materially stronger signal may be derived from the carrier than is permitted with for example $Fe_2O_3$, since the latter material is distributed arbitrarily in the tape in the form of needles, so that there may prevail a deviation of 90° between the recording field and the direction of the magnetic needle, which has the effect that the contribution to the magnetic signal energy stored in the tape is materially smaller, while, moreover, owing to internal demagnetization, a smaller part of the stored signal energy is available for the reproduction.

The limit wavelength attainable with the aforesaid method is determined approximately by the mean size of the discs. It may be desirable to have an appreciably higher limit wavelength. To this end use may be made of the property that the thickness of the discs of magnetic material is usually smaller than the diameter.

Figure 3:
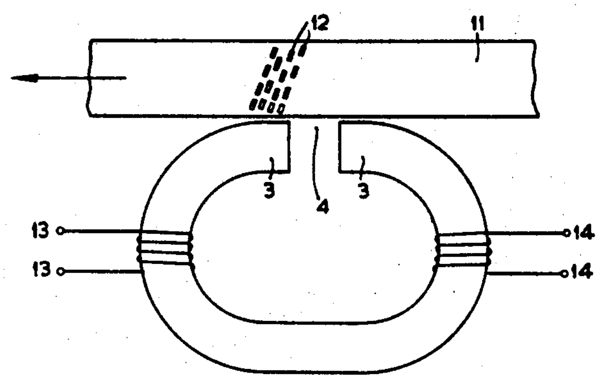
FIG. 3 shows an embodiment, in which the preferred planes of the magnetic powder particles are parallel to the direction of the critical field intensity.

With the embodiment shown in FIG. 3 the tape carrier 11 contains pre-oriented discs of magnetic material, for example of the aforesaid composition. The position of these discs is such that the major surfaces are parallel to the direction of thickness (i.e. at right angles to the plane of the drawing) while they exhibit a prescribed inclination with respect to the direction of length of the tape, which will be explained hereinafter.

In order to record a signal a high frequency preliminary polarization (terminals 14) simultaneously with the magnetic signal field (terminals 13) is rendered, in known manner, active in the air gap 4 of the pole shoes 3, so that the discs 12 are magnetized alternately in one direction and in the other and will finally assume a remanent magnetic value corresponding to the signal strength at a certain distance from the air gap 4, where the field intensity of the preliminary polarization has dropped to a critical value. The slope of the discs 12 then corresponds to the direction of this critical field intensity, which, in turn, is determined by the gap length in the head and the intensity of the preliminary polarization field, so that the tape is to be used preferably in conjunction with recording heads of which the gap length lies within a given interval (for example 5 to 10$\mu$).

Figure 4:
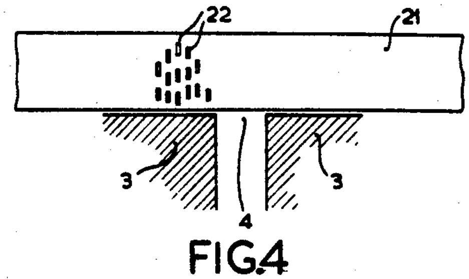
FIG. 4 shows an embodiment, in which the powder particles are arranged in a manner such that their preferred planes are at right angles to the direction of length of the tape.

The tape 11 can then record and be erased only in one direction, indicated by the arrow. It may be advantageous to pre-orient the discs 12 in a direction at right angles to the direction of length of the gap, as is indicated in FIG. 4, so that the tape 21 has no longer a predetermined recording direction. Then the magnetic discs 22 react only to the vertical component of the aforesaid critical field intensity. Since, however, this component has sharp maxima in the proximity of the boundaries between the pole shoes 3 and the air gap 4, the resolving power is thus increased for the recording operation, since it increases according as the field gradient is higher.

What is claimed is:

1. A magnetic recording medium adapted to record and reproduce electrical intelligence signals comprising a strip-like non-magnetic carrier having a length and breadth substantially greater than its thickness and a magnetically anisotropic material distributed in said carrier consisting of disc-shaped particles which exhibit a preferred plane of magnetization, said particles being magnetically oriented and having their major surfaces parallel to the direction of thickness of the carrier so that the magnetic permeability thereof in a direction parallel to the direction of thickness of the carrier and at least one other direction is greater than that measured in one of the directions at right angles to the direction of thickness.

2. A magnetic recording medium adapted to record and reproduce electrical intelligence signals comprising a strip-like non-magnetic carrier having a length and breadth substantially greater than its thickness and a magnetically anisotropic material distributed in said carrier consisting of disc-shaped particles which exhibit a preferred plane of magnetization, said particles being magnetically oriented and having their major surfaces parallel to the direction of thickness and parallel to the direction of width of the carrier so that the magnetic permeability thereof in a direction parallel to the direction of thickness of the carrier and at least one other direction is greater than that measured in one of the directions at right angles to the direction of thickness, said material having the lowest magnetic permeability in the direction of width of the carrier.

3. A magnetic recording medium adapted to record and reproduce electrical intelligence signals comprising a strip-like non-magnetic carrier having a length and breadth substantially greater than its thickness and a magnetically anisotropic material distributed in said carrier consisting of disc-shaped particles having a composition $Ba_2Me_2Fe_{12}O_{22}$ in which Me is a bivalent metal ion selected from the group consisting of Co, Ni, Mn, Fe, Mg and Zn, and which exhibit a preferred plane of magnetization, said material being magnetically oriented and having their major surfaces parallel to the direction of thickness and inclined to one of the directions of length and width so that the magnetic permeability thereof in a direction parallel to the direction of thickness of the carrier and at least one other direction is greater than that measured in one of the directions at right angles to the direction of thickness.

4. A magnetic recording medium adapted to record and reproduce electrical intelligence signals comprising a strip-like non-magnetic carrier having a length and breadth substantially greater than its thickness and a magnetically anisotropic material distributed in said carrier consisting of disc-shaped particles having a composition $Ba_3Me_2Fe_{24}O_{41}$ in which Me is a bivalent metal ion selected from the group consisting of Co, Ni, Mn, Fe, Mg and Zn, and which exhibit a preferred plane of magnetization, said particles being magnetically oriented and having their major surfaces parallel to the direction of thickness of the carrier so that the magnetic permeability thereof in a direction parallel to the direction of thickness of the carrier and at least one other direction is greater than that measured in one of the directions at right angles to the direction of thickness.

References Cited in the file of this patent

UNITED STATES PATENTS

| | | |
|---|---|---|
| 2,199,526 | McCowen | May 7, 1940 |
| 2,547,948 | Kornei | Apr. 10, 1951 |
| 2,578,407 | Ebeling | Dec. 11, 1951 |
| 2,582,590 | Heeren et al. | Jan. 15, 1952 |
| 2,643,130 | Kornei | June 23, 1953 |
| 2,689,168 | Dovey | Sept. 14, 1954 |
| 2,694,656 | Camras | Nov. 16, 1954 |
| 2,711,901 | Von Behren | June 28, 1955 |
| 2,825,670 | Adams et al. | Mar. 4, 1958 |
| 2,827,437 | Rathenau | Mar. 18, 1958 |
| 2,828,264 | Medvedieff | Mar. 25, 1958 |
| 2,837,483 | Hakker et al. | June 3, 1958 |
| 2,849,312 | Peterman | Aug. 26, 1958 |

OTHER REFERENCES

Jonker et al.: Philips Technical Review, vol. 18, No. 6, 1956, pp. 145–154.